United States Patent
Miura et al.

(10) Patent No.: US 6,252,997 B1
(45) Date of Patent: Jun. 26, 2001

(54) METHOD FOR IMAGE PROCESSING

(75) Inventors: Takashi Miura; Hidemichi Goto, both of Hokkaido (JP)

(73) Assignee: Hudson Soft Co., Ltd., Hokkiado (JP)

( * ) Notice: Subject to any disclaimer, the term of this patent is extended or adjusted under 35 U.S.C. 154(b) by 0 days.

(21) Appl. No.: 09/182,041

(22) Filed: Oct. 29, 1998

(51) Int. Cl.$^7$ .............. G06K 9/44; G06T 15/10; G06T 5/20

(52) U.S. Cl. ........................... 382/261; 382/264

(58) Field of Search ................... 382/264, 261, 382/260; 345/136, 419, 427

(56) References Cited

FOREIGN PATENT DOCUMENTS

| | | | | |
|---|---|---|---|---|
| 10074258 | * | 3/1998 | (EP) | G06T/5/20 |
| 1056050 | * | 11/2000 | (EP) | G06T/15/00 |
| 1063616 | * | 12/2000 | (EP) | G06T/15/10 |

* cited by examiner

*Primary Examiner*—Scott Rogers
(74) *Attorney, Agent, or Firm*—Scully, Scott, Murphy & Presser

(57) ABSTRACT

A method for image processing to facilitate expression with more reality of sense of distance by blurring is provided. In the method according to the invention, image data having far and near distance information of the image are processed by a digital low-pass filter having a cut-off frequency corresponding to the distance information, so that a blurred image based on the distance information is formed.

7 Claims, 6 Drawing Sheets

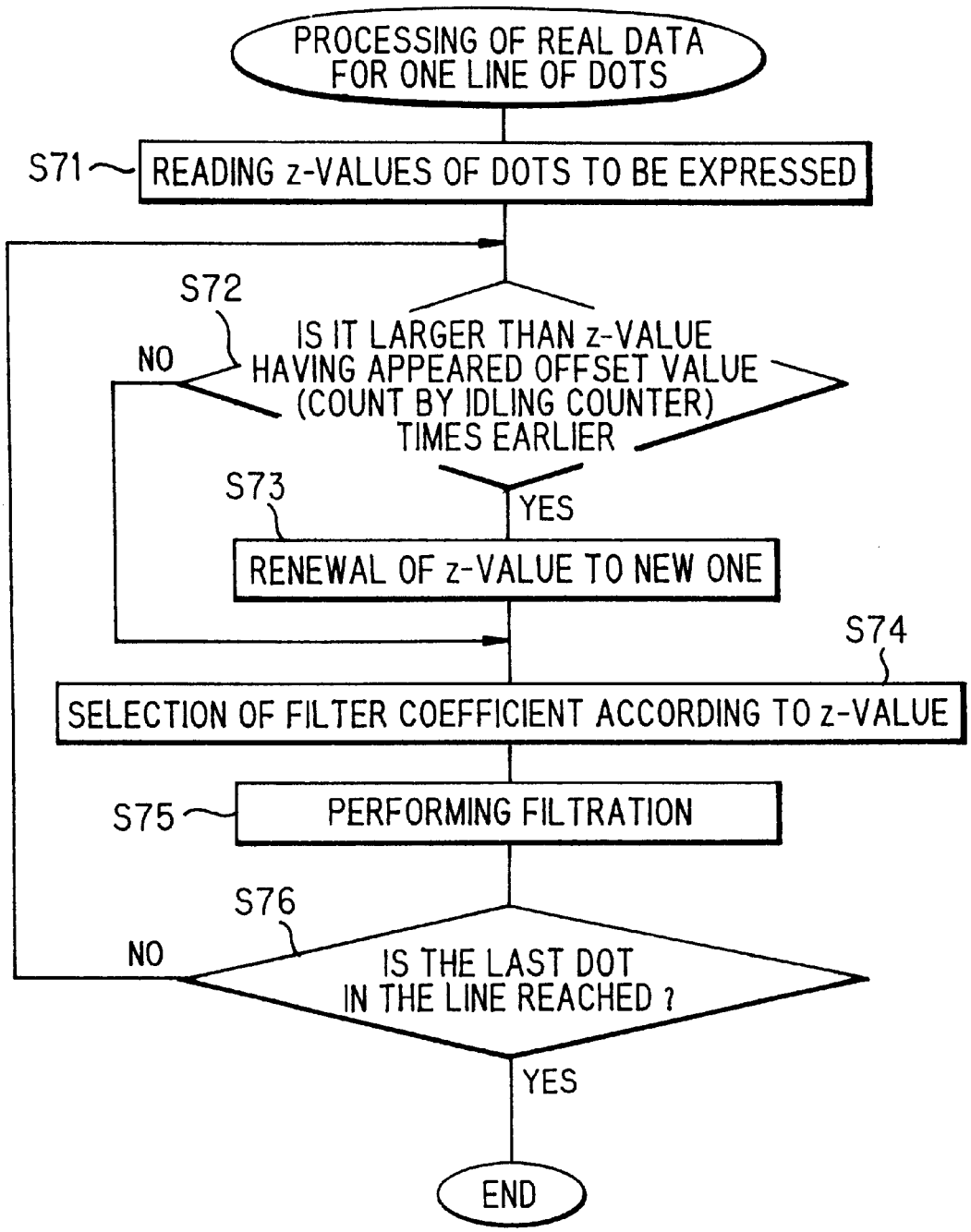

METHOD FOR IMAGE PROCESSING

FIELD OF THE INVENTION

The invention relates to a method for image processing in a computer and a computer adapted thereto.

BACKGROUND OF THE INVENTION

One of the methods for expressing a sense of volume or distance is blurring. For example, when a photograph is taken, an object just in focus is taken clear and degree of blurring is greater as the object is more separated from the focus. It is known that this blurring provides a photograph with a sense of distance.

One of the methods for expressing blurring by means of computer is dispersed beam tracing method. Another method to express blurring more simply is a method disclosed in the patent specifications of Toku-Kai-Hei 6-36025 and Toku-Kai-Hei 2-190898 in which the diameter of a blurring circle around each pixel is calculated based on the information of distance for the pixel and, thereby, spreading area of blurring extended to neighboring pixels is determined to show the sense of distance. Calculation of blurring process is carried out with dots of 3 by 3 in Toku-Kai-Hei 2-190898 and with dots of 5 by 5 in Toku-Kai-Hei 6-36025.

Of the methods referred to above, the dispersed beam tracing method requires a lot of time for calculation, such as for calculating on a multitude of beams to build up a blurred image related to one pixel. The method of calculating the effect of neighboring pixels on the pixel of interest can be carried out in shorter period than dispersed beam tracing method but it is associated with other problems.

For example, in the method disclosed in Toku-Kai-Hei 6-36025, the effect of neighboring pixels is taken into account with the use of a kernel of 5 by 5 to accomplish sense of distance, but pixels that can be considered with respect to the latter are those only two pixels remote from the pixel of interest. For calculation of data required to express a pixel, data on a kernel of 25 pixels including neighboring pixels have to be added after processing, resulting in heavy burden of calculation. 25 weight coefficients involved in the kernel have to be calculated for each pixel, thereby the burden of calculation increases. Weight coefficients for dots other than that in the center of the kernel are calculated by the following equation:

$$fw_{i,j}=|(1-fw_{33})/(5\times5-1)|\times df_{i,j}$$

The equation above can be transformed as follows:

$$fw_{i,j}=(df_{33}\times df_{i,j})/(5\times5-1)$$

This equation indicates multiplication of distance by distance. Therefore, repeating of filter processing seems to be needed, with the times of filtration set to control the degree of blurring. This repeated processing also increases burden of calculation.

In the method of Toku-Kai-Hei 2-190898, effect of surrounding pixels is taken into account based on a mask register of 3×3, but it is the effect of only pixels directly adjacent to the pixel of interest that can be dealt with. Moreover, addition of data on mask registers of 9 pixels including surrounding pixels subsequent to the processing is required to accomplish the calculation of data for expressing a pixel of interest. In this method, it is rather easy to select a suitable mask register based on the distance information but it is difficult to design the contents of mask register (weight coefficients) in accordance with the distance.

For a very far object, the effect of pixels remote as much as 10 pixels from the pixel of interest may contribute in view of characteristics of human vision. To encounter such an effect, the mask register has to be extended to 21×21, thereby addition of data on a mask register of 441 pixels consisting of surrounding pixels subsequent to the processing is required to calculate the data for expressing blurring of a pixel of interest, resulting in an unreasonable burden of calculation. A remarkable difficulty is expected to arise also in designing the contents of masks register in accordance with distance. Thus, real expression of sense of distance is limited in practical application of the method.

SUMMARY OF THE INVENTION

Accordingly, it is an object of the invention to provide a method for processing image data capable of expressing sense of distance with more reality by blurring of the image and improved in the efficiency of processing, whereby the burden of calculation is decreased.

It is another object of the invention to provide a method for processing image data capable of expressing sense of distance by blurring of the image having compatibility with a conventional rendering system.

It is still another object of the invention to provide a digital computer adapted to the method for processing image data capable of expressing sense of distance with more reality by blurring of the image.

According to the invention, a method for processing image data having far and near distance information comprises the step of:

generating images including a blurred image in accordance with the far and near distance information by applying image processing by a digital low pass filter to the image data;

wherein the digital low pass filter has a cut-off frequency corresponding to the far and near distance information.

According to the invention, a method for processing image data having far and near distance information of images preferably comprises the step of:

generating a blurred image based on an image selected from the images by applying image processing by a digital low pass filter to the image data of the selected image to remove higher frequency components therefrom;

wherein the digital low-pass filter has a cut-off frequency lower than the highest frequency of frequency components in the image data of the selected image, represented by the formula;

$$f_d=kf_m;$$

$f_d$ representing the cut-off frequency, $f_m$ representing the highest frequency of frequency components in the image data to be processed contain and k representing a positive variable less than 1.

According to the invention, a digital computer in which image data having far and near distance information are processed so as to generate images including a blurred image comprises: a digital low-pass filter for generating the blurred image based on the far and near distance information, having a cut-off frequency represented by the formula:

$$f_d=kf_m;$$

$f_d$ representing the cut-off frequency, $f_m$ representing the highest frequency of frequency components in the image data to be processed and k representing a positive variable less than 1; and a medium for recording a program to execute the process to generate the images including the blurred image. information means the information of distance between the object and the observer, including a camera such as still camera, TV camera etc.

The effect of blurring is determined by controlling the highest frequency of frequency components contained in the distance information of the image. Concerning the control, the present invention permits assignment of the distance to a blurred image freely and quantitatively by approximating the characteristics of human vision by a digital filter having frequency characteristics in accordance with the distance information of the blurred image.

The cut-off frequency $f_d$ of a digital low-pass filter used in the invented method is determined in relation to the highest frequency $f_m$ of frequency components which the original image contain, by the following equation:

$$f_d = kf_m;$$

where k is a positive variable not larger than 1. The variable k is the reciprocal of the ratio of the number of dots in the processed image of minimum discernible dimension to the number of dots in the original image of minimum discernible dimension.

BRIEF DESCRIPTION OP THE DRAWINGS

The invention will be described in more detail in conjunction with the accompanying drawings, wherein:

FIG. 7 is a block diagram of the process for image data processing according to the invention, particularly indicating the step of real data processing.

DESCRIPTION OF THE PREFERRED EMBODIMENTS

Figure 1:
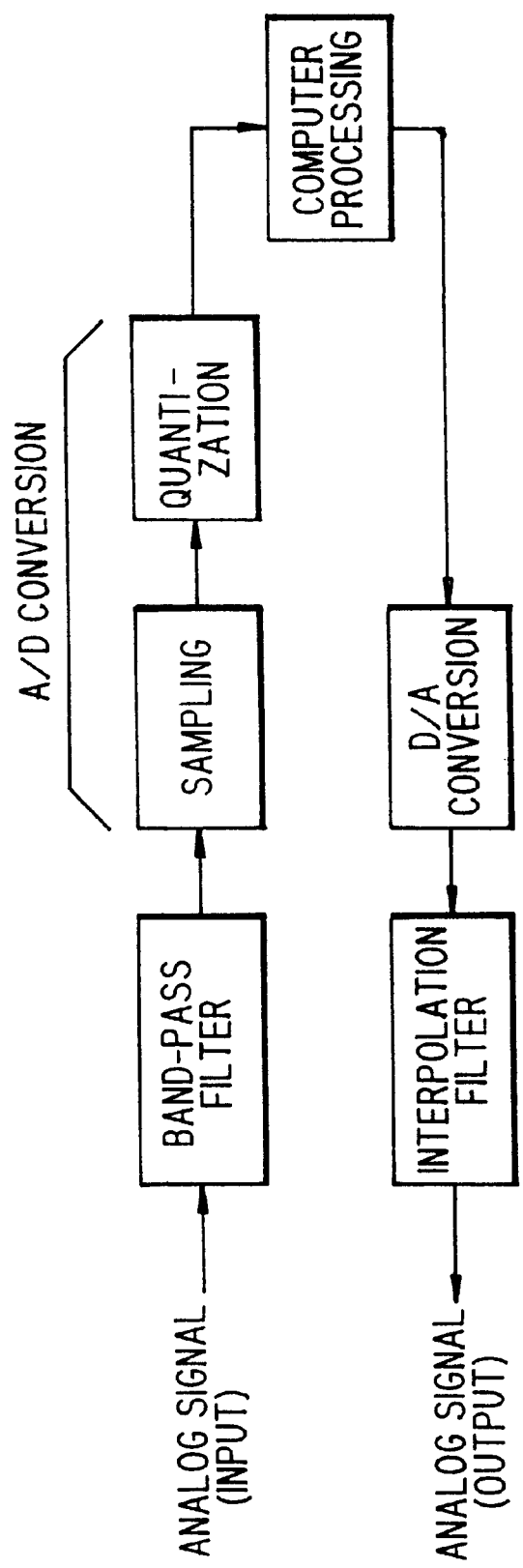
FIG. 1 is a block diagram of the process for image data processing.

Before explaining preferred embodiments of the invention, the general flow of an image data processing consisting of A/D conversion, computer processing and D/A conversion will be explained with reference to FIG. 1.

Image data used in a computer are digital data. All of the information in nature is continuous, i.e. analog, data. Thus, analog data are converted to digital data by way of an A/D converter (analog/digital converter) so as to be processed by a computer. In order to display digital data in a display apparatus such as video monitor, the digital data are converted to electric analog data, again, by way of a D/A converter (digital/analog converter). FIG. 1 shows the flow to output an image information consisting of digitizing (A/D conversion) of an analog image, processing of the digital information by a computer and converting the digital information to an analog information again (D/A conversion) to output an analog image.

Figure 2A:
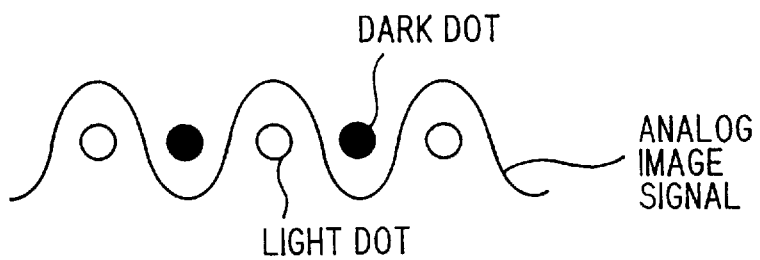
FIG. 2A and FIG. 2B are explanatory views of digital images and analog image signals.
Figure 2B:
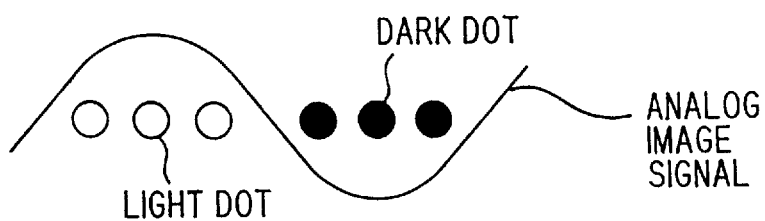

An image is expressed by a group of dots in order to be indicated on display of a video monitor or a computer display. FIGS. 2A and 2B show the idea of relation between dots and the analog signal corresponding thereto. FIG. 2A indicates a row of dots being light, dark, light, dark and so on, respectively. FIG. 2B indicates a row of dots being light, light, light, dark, dark, dark, and so on, respectively. The analog signal of image in FIG. 2A consists of waves having a shorter cycle, while that in FIG. 2B consists of waves having a longer cycle.

Before explaining the preferred embodiments, further, the basic principle of the present invention will be explained. When a person tries to recognize a small object, any object smaller than a limit is recognized merely as a lump. The dimension of the smallest object recognizable can be determined by the smallest angle between the lines connecting the periphery of the object and an eye. A near object and a far object of the same dimension are different in relation to the smallest angle of vision. The farther an object is seen, the broader is the minimum area of the object which is recognized merely as a small point.

Sampling is an operation of converting an input signal to discrete signals in the time axis by generating pulses at a certain cycle. Quantization is conversion of an input signal to dispersed signals in the amplitude axis. Sampling signal y(t) is represented by the formula:

$$y(t) = \mathrm{E} x(t) \delta(t\text{-}nT)$$

where T is a fixed cycle, E represents the summation with respect to time from −infinity to +infinity, and x(t) is analog data of the input signal. In general, x(t) is an analog signal of voltage versus time. δ is a delta function, that is, a function being:

$$\delta(t\text{-}nT) = 1 \text{ (for } t=nT\text{)}$$

$$= 0 \text{ (for } t \neq nT\text{)}$$

Where the signal x(t) is a signal of band width W (radian/second), cycle T is represented by:

$$T = \pi/W$$

A function f is defined based on T as:

$$f = 1/(2T) = W/(2\pi)$$

This f is the highest frequency of the frequency components contained in the image information.

In the cases of FIG. 2A and FIG. 2B, the frequency of analog signal in FIG. 2A is three times as high as that in FIG. 2B. This suggests that the number of dots in the image having the smallest dimension of object recognizable by human eye changes in accordance with the highest frequency of frequency components as the latter changes.

Image data used by a computer can be grasped as a group of image data obtained in the sampling frequency. Concerning these data, the highest frequency $f_m$ of components contained in the original data is equal to a half of the sampling frequency fs, that is, $f_s/2$ according to the sampling rule.

The dimension of an object recognizable by human eye is equal to the size of one dot in the expressed image. When the highest frequency of components contained in the image data changes from $f_m$ to $f_m/2$, the dimension of object recognizable by human eye changes to the size of two dots in the expressed image. By processing the original image data so as to express an image of an object as if the object is located farther, the effect of farther distance is obtained. Such processing can be accomplished by altering the image by blurring to an image discernible in the unit of 1.5 dots or 2 dots, in place of one dot. But the distance information of an image discernible in the unit of 2 dots expresses a fairly far scene. Usually, the distance effect is produced to such an extent that 10 dots in the basic image are recognized as 8 or 9 dots in the blurred image. In such a case, assuming that an original image of minimum discernible dimension consists of 4 dots, the minimum discernible dimension of the blurred image after processing is that of 5 dots.

Where the cut-off frequency $f_d$ of a low-pass filter is expressed by the equation:

$$f_d = kf_m \quad (0 < k \leq 1),$$

the image data subject to low pass filter processing with k=1 have the highest frequency of frequency components similar to those of the original image data, that is, an image without low-pass filter processing, indicating a state in which a processed image is recognizable by every one dot. If k=0.5, image data for an object so distant as being recognizable by every 2 dots are expressed subsequent to the processing. If k=0.8, image data for an object so distant as to be recognizable by every 10 dots are altered by blurring processing to those for an image recognizable by every 10/0.8 dots. In other words, dots of number equal to the reciprocal of k is recognized as one dot. Thus, data for an image blurred so as to arouse a sense of distance associated with a specified distance can be produced by changing the value of k according to the specified distance.

As explained above, the effect of out-of-focus can be accomplished by controlling the highest frequency contained in the image data which is initially the sampling frequency. Accordingly, the invention makes it possible to assign any distance to an image quantitatively by simulating the human vision in the frequency control by means of a digital filter having frequency characteristics corresponding to the assigned distance.

Image data used in a computer may be taken at various

Image data used in a computer may be taken at various frequencies. In most cases, however, no information related to the sampling frequency can be obtained, arising a problem. According to the invention, given image data can be converted from those of an image recognizable by every one dot to those recognizable by 1/k dot. The problem above cannot be a serious obstacle by using the mathematics below.

An example of digital low pass filter is Butterworth filter. This filter may be of order either of even number or of odd number. Whichever the order is, it makes no difference, thus, an embodiment using a Butterworth filter of even order will be explained in the following. The transfer function of a digital Butterworth filter having an order n=2 m, a cut-off frequency $\omega_d = 2\pi f_d$, and a sampling frequency $f_s = 1/t_s$, is represented by EQUATION 1.

$$H_{2m}(\omega_d, z) = \prod_{p=0}^{m-1} \frac{C_{0P}(1 + 2z^{-1} + z^{-2})}{1 + A_{1p}z^{-1} + A_{2p}z^{-2}} \quad \text{EQUATION 1}$$

-continued $$C_{0P} = \frac{Q_p(ts\omega cp)^2}{4Q_p + 2ts\omega cp + Qp(ts\omega cp)^2}$$

$$A_{1P} = \frac{2Q_p\{-4 + (ts\omega cp)^2\}}{4Q_p + 2ts\omega cp + Qk(ts\omega cp)^2}$$

$$A_{2P} = \frac{4Q_p - 2ts\omega cp + Qp(ts\omega cp)^2}{4Q_p + 2ts\omega cp + Qp(ts\omega cp)^2}$$

$$P_p = \cos\left(\frac{\pi(2p + 1 + 2m)}{4m}\right) \quad (0 \leq p < m)$$

$$\omega cp = \omega d, \quad Qp = -\frac{1}{2P_p}$$

Provided: $f_d = kf_m$, $\omega_d = 2\pi f_d$, $\omega_m = 2\pi f_m$, $\omega_d = k\omega_m = k\omega_s/2$, the term $t_s\omega cp = t_s\omega_d$ is represented as follows:

$$t_s\omega cp = t_s\omega_d = t_s k\omega s/2 = (1/f_s)(2\pi kf_s/2) = k\pi$$

As the sampling frequency $t_s$ is not present in the last expression of Equation 1, it is found that the transfer function has no relation to the sampling frequency, being represented only by the ratio k of the cut-off frequency $f_d$ to a half of the sampling frequency $f_m$.

Figure 3:
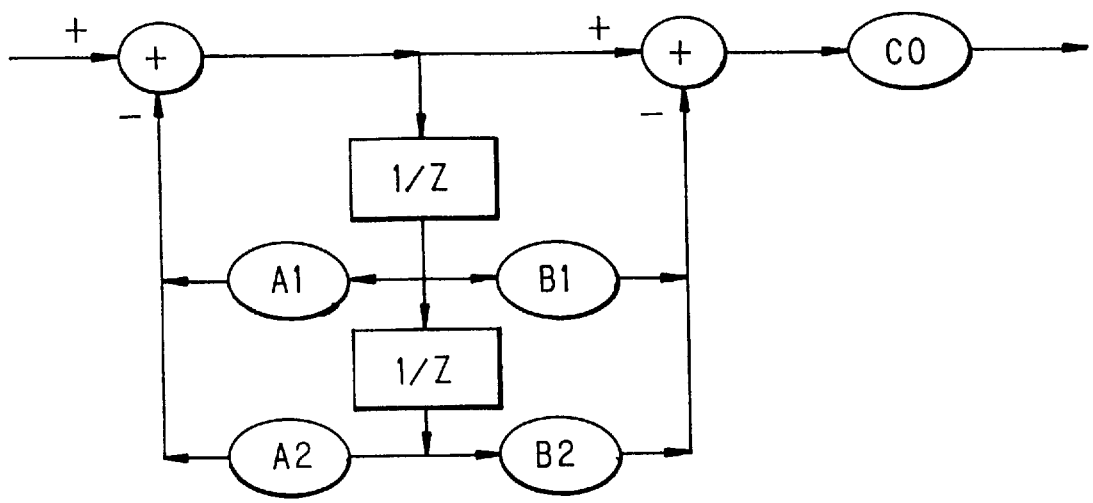
FIG. 3 is a block diagram of the process for image data processing by means of a digital low-pass filter.

FIG. 3 shows the data processing performed by a digital low pass filter of order n=2 m. Data are processed by the filter in series of m steps. Low-pass filters include Tchebycheff filter, Anti- Tchebycheff filter and elliptic function filter, in addition to Butterworth filter. Transfer function for any of them is expressed by the parameter k above.

An example of transfer function to which the invention is applied in practice will be shown. In this example, a processing, called pre-warp, is performed upon frequency conversion from analog to digital. Pre-warp processing is represented by the following equation.

$$\omega_a = (2/t_s)\tan(\omega_d t_s/2)$$

This equation means that a digital filter having a cut-off frequency $\omega_d$ and sampling frequency $t_s$ is designed based on an analog filter having a cut off frequency $\omega_a$. But for this processing, errors in the transfer characteristics from those expected occur as the frequency approaches from a lower angular frequency to cut off frequency $\omega_d$. Referring to Equation 1, the term $t_s\omega cp = t_s\omega_d$ above is to be:

$$t_a(2/t_s)\tan(\omega_d t_s/2) = 2\tan(k\pi/2)$$

Examples of the coefficients in transfer function $H_{2m}(d,z)$ by EQUATION 1 are shown in TABLE 1 below.

TABLE 1

TRANSFER FUNCTION $$H_{2m}(\omega_d, Z) = \prod_{p=0}^{m-1} \frac{C_{0P}(1 + 2z^{-1} + z^{-2})}{1 + A_{1p}z^{-1} + A_{2p}z^{-2}}$$

EXAMPLES OF COEFFICIENTS

FOR SECOND-ORDER FILTER AND k = 0.9
$C_{0p}$ = 0.8008, $A_{1p}$ = 1.561, $A_{2p}$ = 0.6414
FOR SECOND-ORDER FILTER AND k = 0.8
$C_{0p}$ = 0.6389, $A_{1p}$ = 1.143, $A_{2p}$ = 0.4128
FOR SECOND-ORDER FILTER AND k = 0.7
$C_{0p}$ = 0.5050, $A_{1p}$ = 0.7478, $A_{2p}$ = 0.2722

TABLE 1-continued

TRANSFER FUNCTION $$H_{2m}(\omega_d, Z) = \prod_{p=0}^{m-1} \frac{C_{0P}(1 + 2z^{-1} + z^{-2})}{1 + A_{1p}z^{-1} + A_{2p}z^{-2}}$$

EXAMPLES OF COEFFICIENTS

FOR SECOND-ORDER FILTER AND k = 0.6
$C_{0p}$ = 0.3913, $A_{1p}$ = 0.3695, $A_{2p}$ = 0.1958
FOR SECOND-ORDER FILTER AND k = 0.5
$C_{0p}$ = 0.2929, $A_{1p}$ = 0.13*10$^{-5}$ ≈ 0, $A_{2p}$ = 0.1716

The transfer function of a digital low pass filter is a function of distance information z, as shown in EQUATION 1. thereby, blurring in relation to distance of the processed image can be expressed by correlating the value of z with coefficient k.

Figure 4:
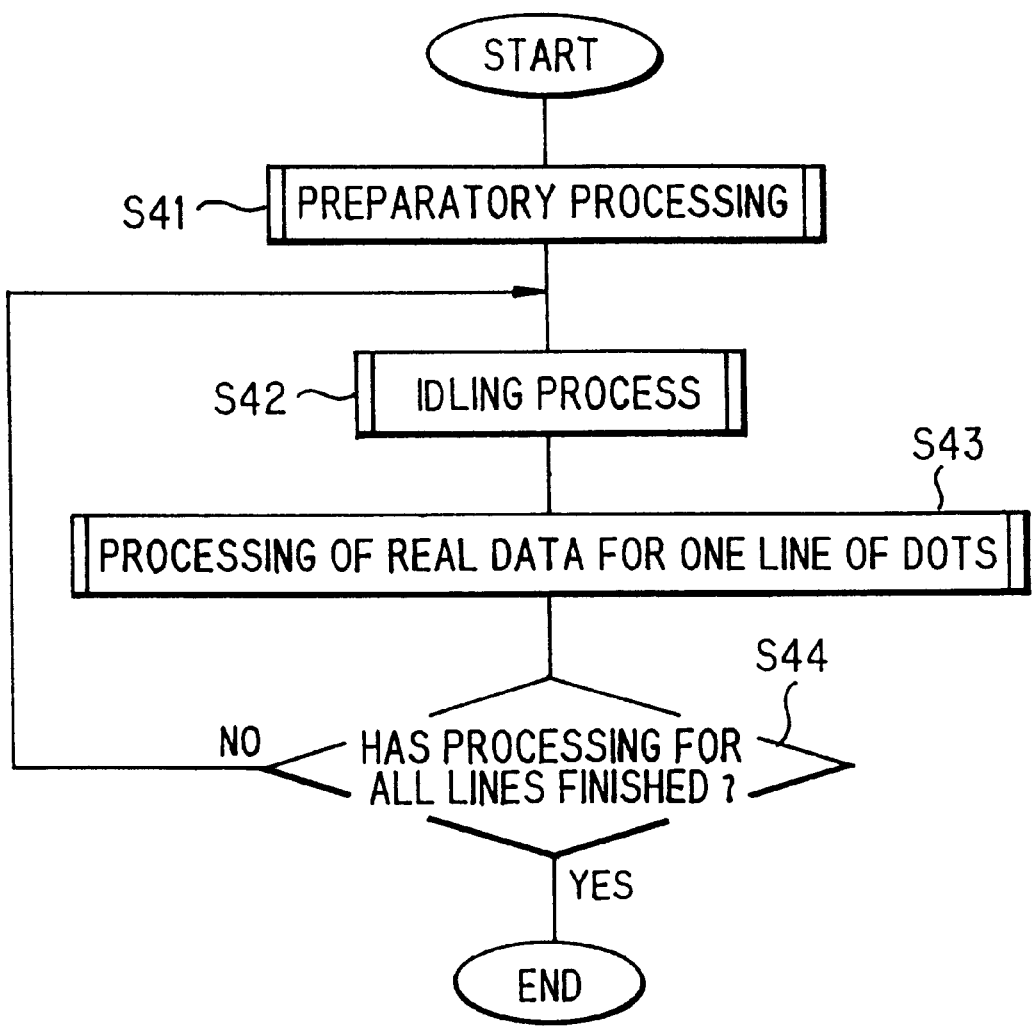
FIG. 4 is a block diagram of the process for image data processing according to the invention.

A preferred embodiment of the present invention will be explained in more detail with reference to an example. In the following example, C Language is used for presentation. In the example, processing according to the invention is performed in the procedures shown in FIGS. 4 to 7. FIG. 4 shows the image data processing to generate a blurred image according to the invention. The image data processing includes the steps of preparatory processing (S41), idling process (S42), processing of real data for one line of dots (S43) and a step of judgment "Has processing for all lines finished?" (S344).

Figure 5:
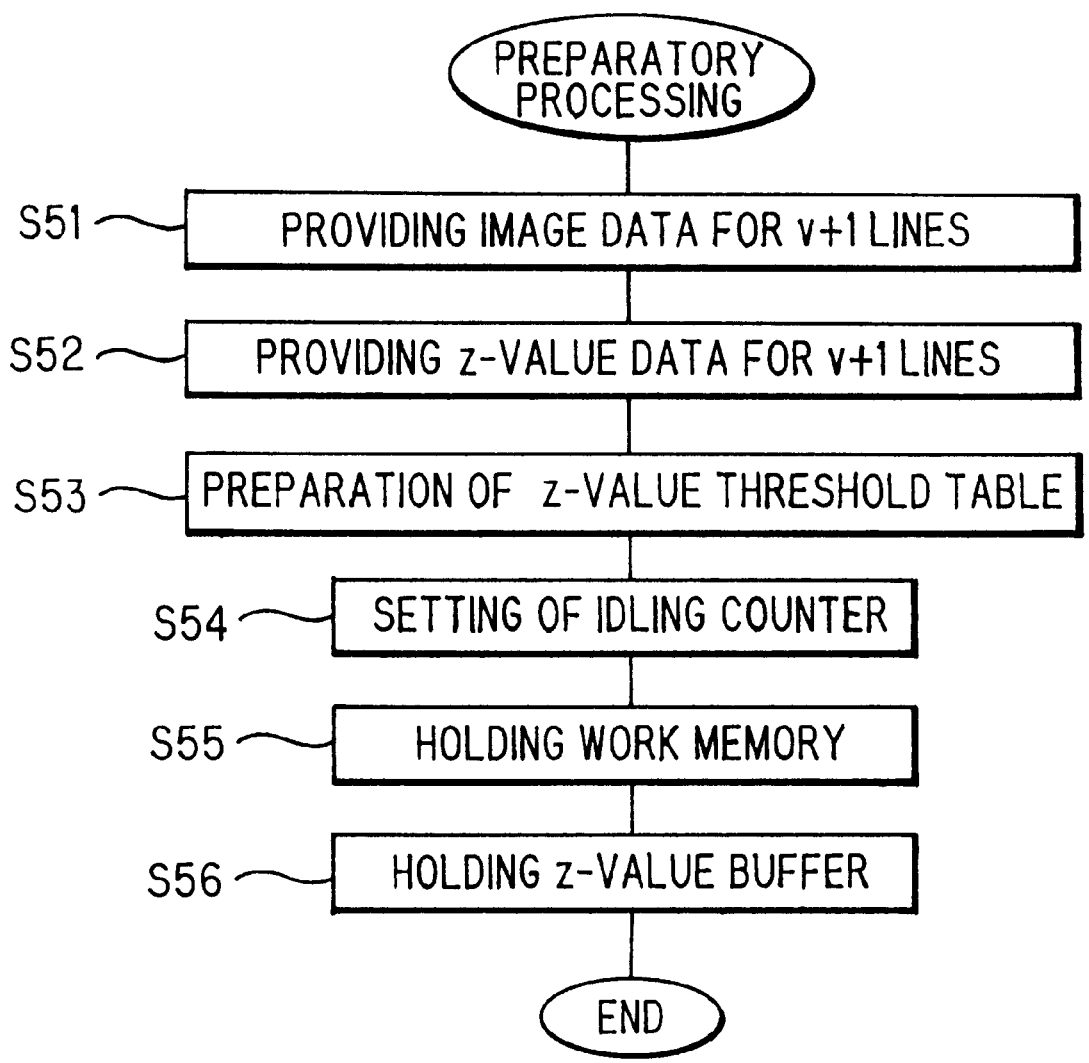
FIG. 5 is a block diagram of the process for image data processing according to the invention, particularly indicating the step of preparation of z value threshold table.

FIG. 5 shows in detail the step of preparatory processing S41 in FIG. 4 for preparing the z-value threshold table. The preparatory step comprises the steps of providing image data for v+1 lines of dots (S51), providing z-value data for v+1 lines (S52), preparation of z-value threshold table (S53), setting of idling counter (S54), holding a work memory (S55) and holding z-value buffers (S56).

The preparatory processing shown in FIG. 5 will be explained in more detail. Steps 51 to 56 are included in preparatory processing S41. Image data are assumed to include w+1 dots, lengthwise, and v+1 dots, across. Image data for v+1 lines of dots are provided in step S51.
The data for a single line are:

$d_0, d_1, d_2, d_3, \ldots d_w.$ z-value data for v+1 lines are provided in step S52. Data of z representing the distance of each pixel are provided for v+1 lines of dots, the data for a single line being:

$z_0, z_1, z_2, \ldots z_w.$

A threshold table for z_tbl[n+1][5] is prepared in step 53. The matrix z_tbl for a Butterworth filter or a Tchebycheff filter is represented in the form shown in TABLE 2 below.

TABLE 2

| VALUES OF z | CUT-OFF VARIABLES | A0 | A1 | C0 |
|---|---|---|---|---|
| z0 | k0 | a00 | a10 | c00 |
| z1 | k1 | a01 | a11 | c01 |
| z2 | k2 | a02 | a12 | c02 |
| . | . | . | . | . |
| . | . | . | . | . |
| . | . | . | . | . |
| zn | kn | a0k | a1k | c0k |

Dual arrangement z[i][j] in C Language corresponds to $Z_{ij}$ in mathematical matrix expression, thus i and j correspond to the line and the row, respectively. For example, with i being 2 and j being 0 to 4, the relation between Table 2 and z_tbl is:

z_tbl[2][0]=$z_2$, z_tbl[2][1]=$k_2$, z_tbl[2][2]=$a_{02}$ z_tbl[2][3]=$a_{12}$, z_tbl[2][4]=$c_{02}$ TABLE 2 is prepared by calculating all of $a_0k$, $a_1k$ and $c_0k$ in the system program based on the definition of cut-off variables k corresponding to n+1 values of z which fulfill:

$z_0 > ; z_1 > ; z_2 > ; > ; Z_n.$

In case where an anti-Tchebycheff filter or an elliptic function filter is used, another filter coefficient $b_1$ is necessary. For example, the cut-off coefficient $k_n$ for $z_n$, the the last value of z, should be 0.99 which causes no blurring.

In step 54 of setting of idling counter, values of 0, 1, 2, 3, . . . , x can be set.

In step 55 of holding work memories, p sets of memories $m_1$ and $m_2$, respectively, are required according to the order of filter 2*p. If the order is 1, only one memory $m_1$ is enough. In step 56 of holding z-value buffers, 0 to x buffers zb for values of z are required according to the value in the idling counter.

After steps 51 to 56 have been finished, processing by a filter of second order is performed, an example of which will be shown below for one line of dots.

Figure 6:
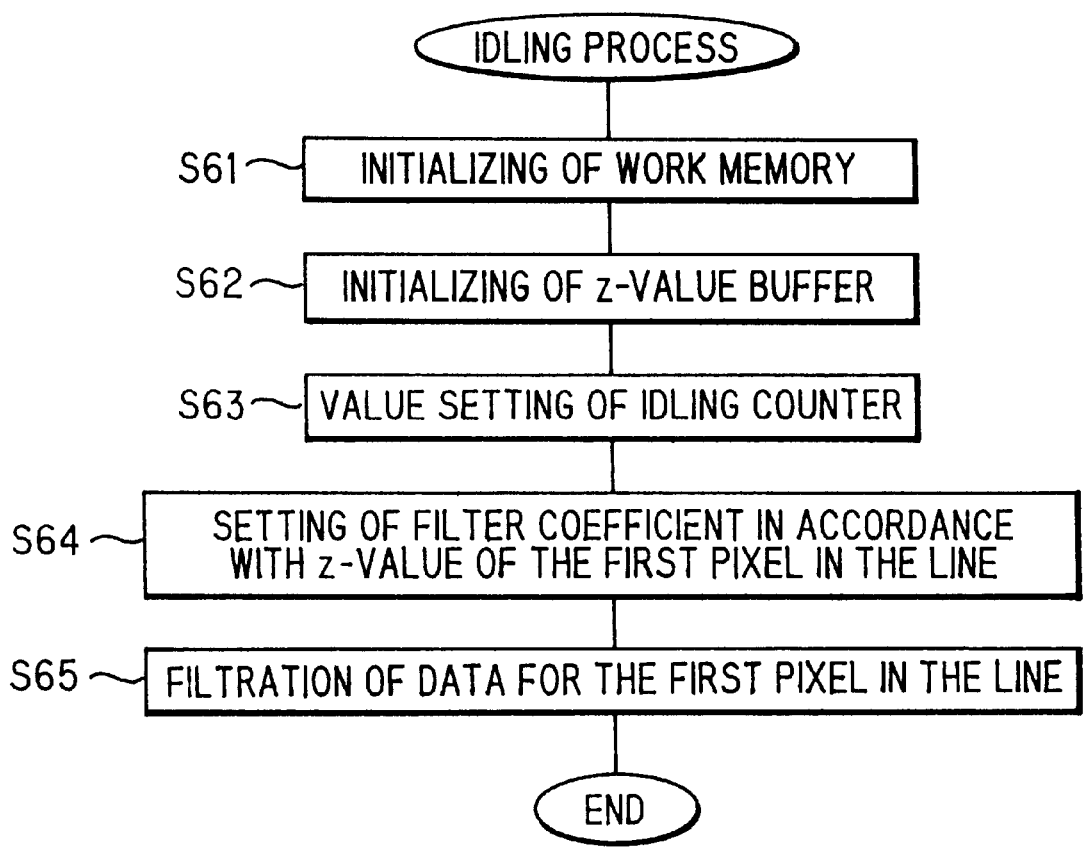
FIG. 6 is a block diagram of the process for image data processing according to the invention, particularly indicating the step of idling process for setting of the filter coefficients.

FIG. 6 shows the detail of idling process shown in FIG. 4. The idling process comprises the steps of initializing of work memory (S61), initializing of z-value buffers (S62), value setting of idling counter (S63), setting of filter coefficient in accordance with z-value of the first pixel in the line (S64) and filtration of data for the first pixel in the line (S65).

Initializing including the following is required:
(1) $m_1$ and $m_2$ are initialized to zero.
(2) zb[0], zb[1], . . . , zb[x−1] are initialized to $Z_n$.
(3) count in the idling counter is substituted for the register variable "offset".
(4) initializing others.

Data processing in the idling process S42 is performed as shown in the following:

```
for(I=0; I<;offset;I++)|
   set_coef(z[0]);      // to set a filter coefficient according to
                        z-value of the first pixel.
   filter(d[0]);        // to input data for the first pixel to the filter.
   zb[offset −1 −I] = z[0];    // to do nothing if offset=0.
|
```

"for(i=0;i<;k;i++)|. . . |" represents to make a loop while "i<k" is satisfied during counting up of i one by one starting from 0, that is, processing |. . . | is repeated k times.

"set_coef(z[0])" and "filter(d[0])" are functions based on user definition, the contents being shown later.

FIG. 7 shows the processing of real data for one line of dots shown in FIG. 4 as step 43. The processing comprises the steps of reading z values of dots to be expressed (S71), a judgment "Is it larger than z value having appeared offset value times earlier?" (S72), renewal of z value to new one (S73), selection of filter coefficient according to z value (S74), performing filtration (S75) and another judgment "Is the last dot in the line reached?" (S76).

The real data processing for dots in one line in step S43 is performed as shown in the following.

```
for(I=0;I<;w+1;I++)|
    if(offset)|
        zf = max(z[I],zb[offset -1]);   // to select a value of z for more
                                           distant scene.
        for(j=offset - 1;j>;0;j--)   zb[j] = 2b[j - 1];
        zb[0] = z[I];
    | else zf = z[I];
    set_coef(zf);   // to set a filter coefficient corresponding to
                       the distance of pixel.
                    // to use set_coef(zn) in order to make
                       distance effect disable, depending on
                       the object.
    out = filter(d[I]);
```

The processing described above is repeated v+1 times for completing the processing of data for all dots concerned. "max" in the program shown above is a function to select the maximum value. If it is written as max(a,b), either one of a and b greater than the other is set as a return value of the function.

"set_coef(zf)" is a function which passes pointer of the coefficient to system variable "coef_pnt". This function performs a processing such as:

for(I=0;I<;n+1;I++) if (zf>;=z_tbl[I][0])coef_pnt=&z_tbl[I][2]

As is clear from the above, I loops from 0 to n, and the address of z_tbl[I][2] satisfying the condition:

"if (zf>;=z_tbl[I][0]" (=&;z_tbl[I][0], that is, pointer of a., <address> in TABLE 2) is set for coef_pnt.

Processing of data in the filter (an example for filter of second order) is as follows:

$f_m$=data-*coef_pnt[0]*$m_1$-*coef_pnt[0]*$m_2$;

$f_{out}$=*coef_pnt[2]*($f_m$+2*$m_1$+$m_2$);

$m_2$=$m_1$; $m_1$=$f_m$;

return $f_{out}$;

The mark * preceding "coef_pnt[j]" means the value of area for the address indicated by the pointer coef_pnt[j], being different from*preceding $m_1$ or $m_2$ (operator for multiplication). Return value of the function "filter" is $f_{out}$.

Next, a problem at the moment of replacing the filter coefficient is considered. It is provided that the present filter coefficient and the content of memory in the filter are indicated as the following, respectively:

$a_0$, $a_1$ and $c_0$; $m_1$ and $m_1$ and $m_2$ (8)

In this state, the output $f_0$ when the filter is provided with input d should be:

$f_0 = c_0^* |d+(2-a_0)^* m_1+(1-a_1)^* m_2|$ (9)

Then, it is assumed that only the filter coefficient is changed to $a_{0d}$, $a_{1d}$ and $c_{0d}$. Then the output based on input d is, similarly to equation (9), represented by the following equation:

$f_{0d} = c_{0d}^* |d+(2-a_{0d})^* m_1+(1-a_{1d})^* m_2|$ (10)

No problem arises if the outputs according to equations (9) and (10) are equal to each other. But, usually, a great difference is present, resulting in a harmful effect on the image output.

This harmful effect on the image output can be prevented by varying the content of memory in the filter so that the outputs according to equations (9) and (10) are equal to each other. To this end, the content of memory is changed as:

$m_1$, $m_2 \rightarrow m_{1d}$, $m_{2d}$ $m_{2d}$ influences only on the present input but mld influences not only the present input but also the next input. Thus, the value of $m_{1d}$ must be adjusted carefully. $m_2$ may be determined by simple way of approximation but m1 should better be determined by an equation shown later.

$m_{2d}$ is determined on the assumption that the term including $m_2$ in equation (9) is equal to that in equation (10). Then, $m_{1d}$ is determined by equation $f_0 = f_{0d}$ in which $m_1$ in equation (10) is replaced by mad. Thus, $m_{1d}$ and $m_{2d}$ are determined in the following way.

$c_0^* |d+(2-a_0)^* m_1+(1-a_1)^* m_2| = c_{0d}^* |d+(2-a_{0d})^* m_{1d}+(1-a_{1d})^* m_{2d}|$ $c_0^*(1-a_1)^* m_2 = c_{0d}^*(1-a_{1d})^* m_{2d}$ $\therefore m_{2d} = [|c_0^*(1-a_1)|/|C_{0d}^*(1-a_{1d})|]^* m_2$ $\therefore m_{1d} = |(c_0-c_{0d})^* d + c_0^*(2-a_0)^* m_1|/|c_{0d}^*(2-a_{0d})|$ A problem arising at the stage of replacement of the filter coefficient with the use of a first order filter will be explained. Where k is the cut-off variable, the transfer function of a first order filter is represented by EQUATION 2 below:

$$H(k, z) = \frac{\tan\left(\frac{k\pi}{2}\right)(1+z^{-1})}{\left\{1+\tan\left(\frac{k\pi}{2}\right)\right\} + \left\{\tan\left(\frac{k\pi}{2}\right)-1\right\}z^{-1}} \quad \text{EQUATION 2}$$

$$= \frac{\dfrac{\tan\left(\frac{k\pi}{2}\right)}{1+\tan\left(\frac{k\pi}{2}\right)}(1+z^{-1})}{1+\dfrac{\tan\left(\frac{k\pi}{2}\right)-1}{1+\tan\left(\frac{k\pi}{2}\right)}z^{-1}}$$

$$= \frac{Co(1+z^{-1})}{1+a_1 z^{-1}}$$

Filtration for input d in this status is represented by the program as follows:

$f_m = d - a_1 m_1$;

$f_0 = c_0^*(f_m+m_1) = c_0^* |d+(1-a_1)m_1|$;

The output from a filter supplied with input d on the condition where the present filter coefficient and the content of memory in the filter are $a_1$, $c_0$ and $m_1$, respectively, is as follows:

$f_0 = c_0^* |d+(1-a_1)m_1|$ (11)

Here, assuming the case where only the filter coefficients are changed to $a_{1d}$ and $c_{0d}$, the output from the filter supplied with input d is shown as the following:

$f_{0d} = c_{0d}^* |d+(1-a_{1d})m_1|$ (12)

No problem arises if the outputs according to equations (11) and (12) are equal to each other. But, usually, a great difference is present, resulting in a harmful effect on the image output. Improvement can be attained so as to avoid such harmful effect on the image output by varying the content of memory in the filter so that the outputs according to equations (11) and (12), respectively, are equal to each other.

The memory content is assumed to be changed as $m_1 \rightarrow m_{1d}$ for the renewed filter coefficients. Thereby, m1d is determined by equation $f_0 = f_{0d}$ in which $m_1$ in equation (12) is replaced by $m_{1d}$, as shown below.

$$c_0^*|d+(1-a_1)m_1|=c_{0d}^*|d+(1-a_{1d})m_1|$$

$$\therefore m_{1d}=|d^*(c_0-c_{0d}) + c_0^*(1-a_1)^*m_1|/|c_{0d}^*(1-a_{1d})|$$

Modification of the processing in order to solve the problem arising at the stage of replacement of the filter coefficients above is as follows.

(Modification of the processing of set_coef(zf) )

The pointer of coefficient is passed to the system variable coef_pnt. At the same time, the two memories in the filter may be changed to suitable values if the coefficient is changed. It is assumed that the present filter coefficient is contained in $a_0$, $a_1$ and $a_2$. Furthermore, flug "jitu" for real data processing and input data d are supplemented as the reducing numbers.

```
set_coef(zf, jitu, d)
    for (I=0;I<;n+1;I++)|
        if(zf>;= z_tbl[I][0]) |
            coef_pnt = &;z_tbl[I][2];
            if(jitu &;&; (a0 |= *coef_pnt)) |// the case
            where the coefficients are changed in real data
            processing
                a_0d = *coef_pnt; a_1d = *(coef_pnt+1);
                c_0d = *(coef_pnt+2);
                m_1 = ((c_0-c_0d)*d+c_0*(2-a_0)*m_1)/c_0d/(2-a_0d);
                m_2 = c_0*(1-a_1)*m_2/(1-a_1d)/c_0d;
                |
                a_0 =*coef_pnt; a1=*(coef_pnt+1);
                c_0 =*(coef_pnt+2);
                break;
                |
        |
    |
```

(Modification of idling process in one-line processing)

(1) Initializing $m_1$, $m_2$, $a_0$, $a_1$ and $c_0$ to zero.
(2) Initializing zb[0], . . . ,zb[x-1] to $Z_n$.
(3) Substituting the value of idling counter for register variable "offset".
(4) Setting other values.

```
for(I=0; I<;offset;I++)|
    set_coef(z[0],0,d[0]);    // Setting the filter coefficient
                               in accordance with the z value
                               of the first pixel.
    filter(d[0]);              // Inputting the first image data
                               to the filter
    zb[offset -1 -I] = z[0];   // Nothing is done if
                               offset = 0
(Modification of real data processing related to one line)
    for(I=0; I<;w+1;I++)|
        if(offset)|
```

```
            zf=max(z)[I],z_b[offset-1]);   // selecting a z value
                                            for more distant scene.
            for(j=offset-1;j>;0;j--)     z_b[j]=z_b[j-1];
            z_b(0)= z[I];
        | else zf= z[I];
        set_coef(zf, 1, d[I]);   // Setting the filter coefficient
                                  in accordance with the distance
                                  of the pixel.
        // If it is desired to disenable distance effect,
        it may be set_coef(Z_n, 1, d[I])
        out = filter(d[I]);
```

The modification above has made it possible to solve the problem related to changing of the filter coefficients. It is desirable practically to make the time for processing equal, in no relation to whether the coefficients are changed or not.

(Final modification of the processing of set_coef(zf))

The pointer of coefficient is passed to system variable coef_pnt. At the same time, the two memories in the filter may be changed to suitable values if the coefficient is changed. It is assumed that the present filter coefficients are contained in $a_0$, $a_1$ and $c_0$.

```
set_coef(zf, jitu, d) |
    for(I=0; I<;n+1;I11)|//m_1 and m_2 are adjusted for any case
        if(zf>;=z_tbl[I][0]) |
            coef_pnt = &;z_tbl[I][2];
            if(jitu == 0) | // the case of idling process
                a_0 = *coef_pnt; a_1 = *(coef_pnt+1);
                c_0 = *(coef_pnt+2);
                break;
                |
                a_0d = *coef_pnt; a_1d = *(coef_pnt+1);
                c_0d = *(coef_pnt+2);
                m_1 = ((c_0-c_0d)*d+c_0*(2-a_0)*m_1) / c_0d / (2-a_0d);
                m_2 = c_0*(1-a_1)*m_2/(1-a_1d)/c_0d;
                a_0 = a_0d; a_1 = a_1d;
                c_0 = c_0d;
                break;
                |
        |
|
```

(Final modification of idling process in the one-line processing)

(1) Initializing: Initialize m1 and $m_2$ to zero; return to initial setting.
(2) Initialize $z_b[0]$, . . . , $z_b[x-1]$ to $Z_n$. and so forth.

(Final modification of real data processing in the one-line processing)

The modification in the foregoing is applicable.

According to the invention, amount of calculation for one pixel to be outputted is enough to accomplish blurring by means of a filter. For example, in calculation to express the effect of 10 pixels, there is no influence on the calculation load, only the change in cut-off variables being involved. In an application to accomplish the blurring effect only in one direction, either transverse or longitudinal, the image memory for output may be omitted.

According to the invention, only a round of filtration is enough to obtain blurring effect in any degree, and the process is comprehensive because the human vision is simulated in setting the degree of blurring effect. Focusing at a certain distance can be accomplished by setting cut-off variable k for a particular value of z to about 0.99, upon producing the threshold table of z values.

In producing the threshold table of z values, it is admitted to assign k=0.99 for a certain value of z and to assign other values of k enough to obtain blurring effect for other z values related to more remote and closer distances, respectively. Thus, the phenomenon of blurring upon looking at a very close object can be easily expressed.

According to the invention, the range to which the blurring effect extends can be controlled not only by cut-off variables but also by means of an idling counter to some extent, whereby system with greater liberty can be provided. Further, the process of the present invention is adapted to supplement a conventional rendering system, being added behind the latter.

Although the invention has been described with respect to the specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A method for processing image data having far and near distance information, comprising the step of:

generating images including a blurred image in accordance with said far and near distance information by applying image processing by a digital low-pass filter to said image data;

wherein said digital low-pass filter has a cut-off frequency corresponding to said far and near distance information.

2. A method for processing image data having far and near distance information as defined in claim 1, wherein said cut-off frequency is lower than the highest frequency of frequency components in said image data.

3. A method for processing image data having far and near distance information of images, comprising the step of:

generating a blurred image based on an image selected from said images by applying image processing by a digital low-pass filter to the image data of said selected image to remove higher frequency components therefrom;

wherein said digital low-pass filter has a cut-off frequency lower than the highest frequency of frequency components in said image data of said selected image.

4. A method for processing image data having far and near distance information of images as defined in claim 3, wherein said low-pass filter has a cutoff frequency represented by the formula:

$$f_d = k f_m;$$

$f_d$ representing said cut-off frequency, $f_m$ representing the highest frequency of frequency components in said image data of said selected image, and k representing a positive variable less than 1.

5. A method for processing image data having far and near distance information of images composed of dots of the same dimensions, comprising the step of:

generating a blurred image based on an image selected from said images by applying image processing by a digital low-pass filter to the image data of said selected image to remove higher frequency components therefrom;

wherein said digital low-pass filter has a cut-off frequency $f_d$ represented by the formula:

$$f_d = k f_m;$$

$f_m$ representing the highest frequency of frequency components in said image data of said selected image and k representing a positive variable less than 1.

6. A method for processing image data having far and near distance information of images as defined in claim 5, wherein said positive variable k is equal to the reciprocal of the ratio of the number of dots in a part of said blurred image of minimum discernible dimension to the number of dots in a part of said selected image of minimum discernible dimension.

7. A digital computer in which image data having far and near distance information are processed so as to generate images including a blurred image, comprising:

a digital low-pass filter, for generating said blurred image based on said far and near distance information, having a cut-off frequency represented by the formula:

$$f_d = k f_m;$$

$f_d$ representing said cut-off frequency, $f_m$ representing the highest frequency of frequency components in said image data to be processed and k representing a positive variable less than 1; and a medium for recording a program to execute the process to generate said images including said blurred image.

* * * * *